United States Patent [19]

Gamou et al.

[11] Patent Number: 5,129,125
[45] Date of Patent: Jul. 14, 1992

[54] CLEANING MACHINE

[75] Inventors: Akira Gamou; Yoshiaki Kanoh; Shoji Sakai, all of Tokyo; Kenichi Osonoe, Kanagawa; Akio Terai, Tokyo; Masayoshi Tsuchiya, Tokyo; Hideo Koizumi, Tokyo, all of Japan

[73] Assignee: Komatsu Zenoah Company, Japan

[21] Appl. No.: 605,803

[22] Filed: Oct. 29, 1990

[30] Foreign Application Priority Data

Oct. 30, 1989 [JP] Japan .................. 1-279973
Dec. 8, 1989 [JP] Japan .................. 1-141584[U]

[51] Int. Cl.⁵ .................................................. A47L 5/28
[52] U.S. Cl. ................................ 15/352; 15/353; 15/383; 55/303; 55/429
[58] Field of Search ............... 15/347, 352, 353

[56] References Cited

U.S. PATENT DOCUMENTS

| | | | |
|---|---|---|---|
| 2,719,596 | 10/1955 | Kent et al. ................... | 15/347 X |
| 2,985,905 | 5/1961 | Caufield ...................... | 15/353 |
| 3,025,894 | 3/1962 | Hunt ........................... | 15/352 X |
| 3,653,190 | 4/1972 | Lee et al. ..................... | 15/352 X |
| 3,910,781 | 10/1975 | Bryant ......................... | 15/352 X |
| 4,268,288 | 5/1981 | Coombs ........................ | 15/353 X |
| 4,581,050 | 4/1986 | Krantz ......................... | 55/269 |
| 4,868,948 | 9/1989 | Arnold ........................ | 15/340:1 |
| 4,993,107 | 2/1991 | Zoni .......................... | 15/352 |

FOREIGN PATENT DOCUMENTS

| | | | |
|---|---|---|---|
| 3316847 | 8/1984 | Fed. Rep. of Germany . | |
| 608538 | 1/1979 | Switzerland . | |
| 2141328 | 12/1984 | United Kingdom ............. | 15/352 |

Primary Examiner—Chris K. Moore
Attorney, Agent, or Firm—Marger, Johnson, McCollom & Stolowitz, Inc.

[57] ABSTRACT

A cleaning machine includes a frame having wheels, a suction blower having an inlet and an outlet mounted on the frame, an intake opening communicated with the inlet of the suction blower for sucking dirt containing relatively large dirt such as fallen leaves and relatively small dirt such as dust together with air, a main separator for separating the relatively large dirt, a subseparator for separating the relatively small dirt from the air having passed through the main separator, and a dirt receptacle made of an air-impermable material detachably attached under the main separator through a pivoting rod which is pivotably mounted to the frame so as to support the receptacle to the main separator and a clamp member for securing the dirt receptacle to the main separator.

7 Claims, 15 Drawing Sheets

CLEANING MACHINE

BACKGROUND OF THE INVENTION

1. Field of the Invention

The this invention relates to a cleaning machine. In particular, the invention relates to a cleaning machine which comprises a suction blower driven by an engine, a dirt intake communicated with the inlet of the suction blower, a dirt separator communicated with the outlet of the suction blower by means of a duct, and a dirt receptacle disposed under the dirt separator. The cleaning machine sucks dirt on the ground together with air by a powerful sucking force generated by rotation of the suction blower driven by the engine and collects the dirt into the dirt receptacle.

2. Description of the Prior Art

One of known cleaning machines of this type sucks various dirt such as fallen leaves and small powdered earth on the ground together with air by a powerful sucking force generated by a suction blower, separates the dirt from the air by a dirt separator, and collects the separated dirt into an air-permeable dirt bag attached under the dirt separator. Dust such as small powdered earth is prone to clog in the mesh of the dirt bag to increase the resistance to passage of air, thus causing decrease of the sucking power. Further, fine dust clogged in the mesh flies up when taking out the bag and discarding the dirt therein. Furthermore, since a large amount of dirt is collected in a cleaning work by this type of cleaning machines, the dirt bag which is full of the dirt is very heavy and difficult to handle.

SUMMARY OF THE INVENTION

It is therefor an major object of the present invention to provide a cleaning machine with which collected dirt can be easily discarded without dispersing fine dust.

Another object of the present invention is to provide a cleaning machine in which the dirt receptacle full of collected dirt can be easily detached and handled.

To attain the above objects, the cleaning machine of the present invention comprises a suction blower having an inlet and an outlet; an intake opening communication with the inlet of the suction blower; a main separator for separating relatively large dirt such as fallen leaves; a subseparator for separating relatively small dirt such as dust from the air diescharged from the main separator; and a dirt receptacle made of an air-impermeable material detachable attached under the main separator.

According to the cleaning machine of the present invention as constructed above, the relatively large dirt is first separated by teh amin separator and collected into the dirt receptacle. The dust-laden air discharged from the main separator is forced to flow into the subseparator because it can not flow out through the dirt receptacle made of the air-impermeable material. In the subseparator the small dirt is removed from the air, and the air is discharged outside. In this construction, only the relatively large dirt such as fallen leaves and pieces of waste paper is collected into the dirt receptacle detachably attached under the main separator. Moreoer, the dirt receptacle is made of an air-impermeable material and has no mesh into which dust is liable to clog. The dirt can then be easily discarede from the receptacle without dispersing the fine dust.

Further, the cleaning machine of the this invention may be so constructed that one side of the top end of the dirt receptacle is put on a pivoting rod and the opposite side is secured to the bottom end of said main separator by a locking mechanism. According to this construction, the dirt receptacle can be easily attached and detached by the operator without any assistance. Thereby the efficiency of work is imiproved and the fatigue of the operator is reduced.

Further, the dirt receptacle may be provided with wheel on the bottom so that the dirt receptacle can be easily moved after being detached from the machine.

Further, the dirt receptacle and the locking mechanism of the dirt receptacle may be constructed so that a dirt bag made of an air-impermeable material can be additionally held within the dirt receptacle. According to this construction, the collected dirt can be very easily taken out from the dirt receptacle and discarded.

Furthermore, the dirt receptacle may be provided with air holes in the bottom. If so, the dirt bag is automatically filled out to fit the inner side of the dirt receptacle by the assistance of a higher air pressure inside the machine. In addition, since water flows out from the air holes, washing of the dirt receptacle is made easier.

The other objects, constructions, and advantages of this invention will become apparent from the detailed description of the preferred embodiments of this invention below.

BRIEF EXPLANATIONOF THE DRAWINGS

FIG. 1 whosw a side sectional view of the first embodiment of the this invention;

Figure 12:
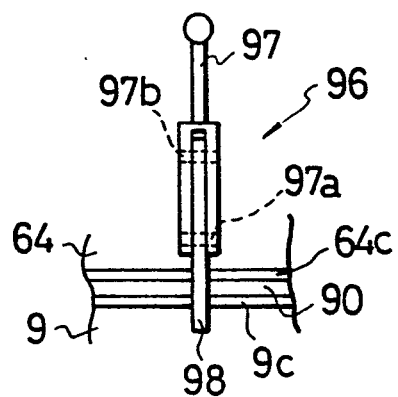
Figure 13:
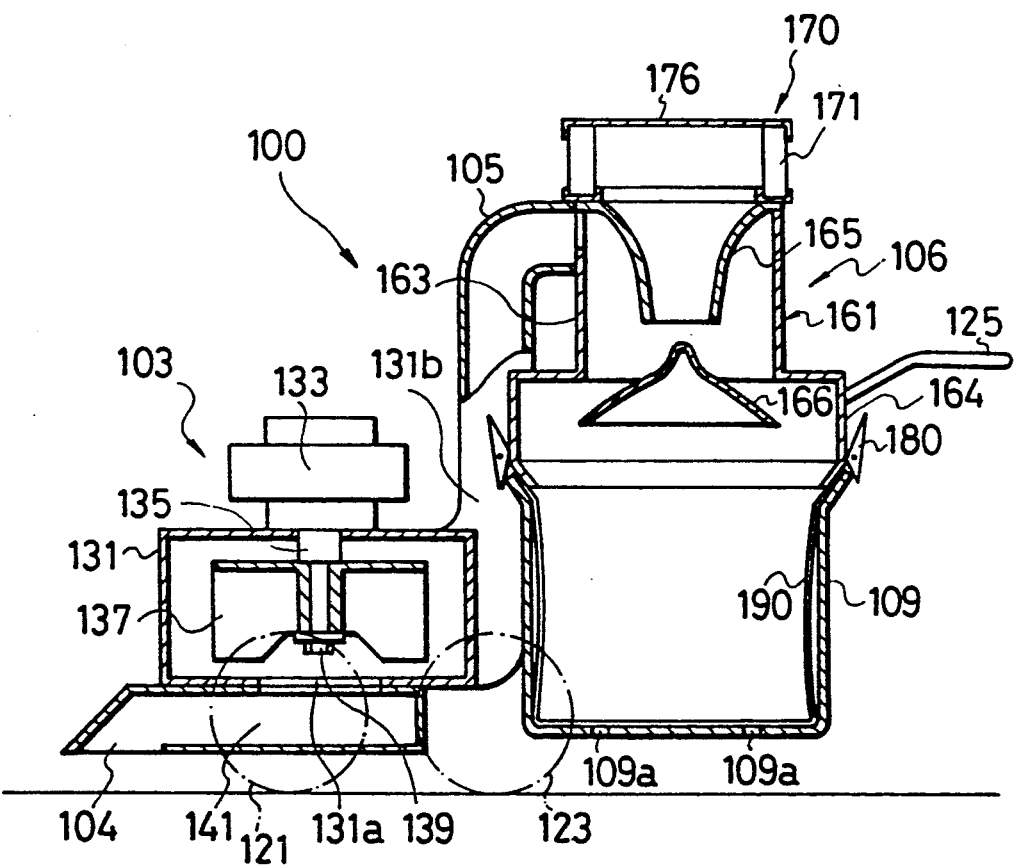
Figure 14:
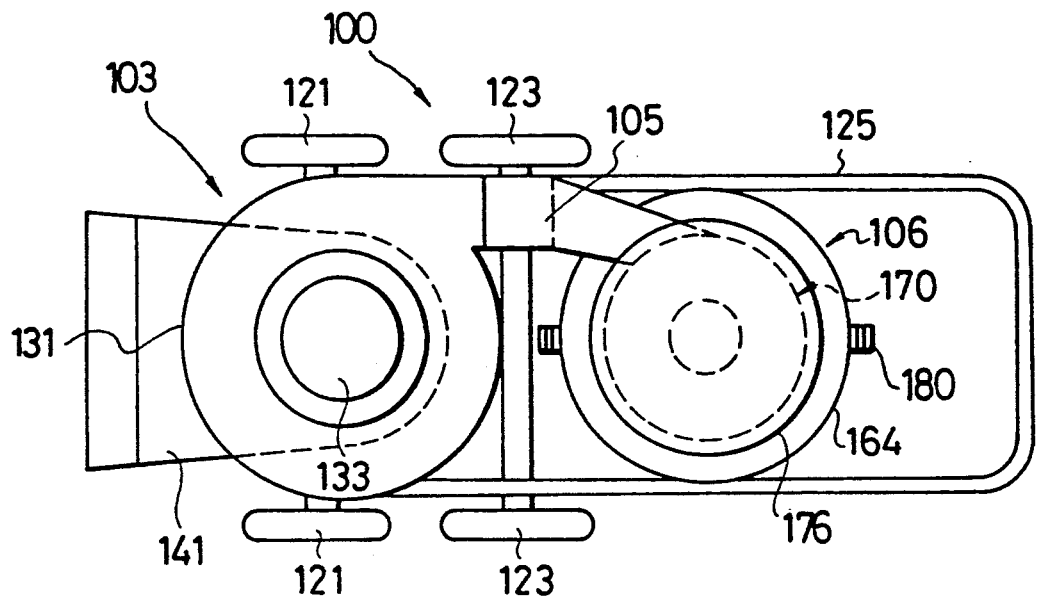
Figure 15:
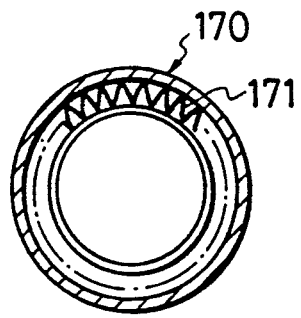
Figure 16:
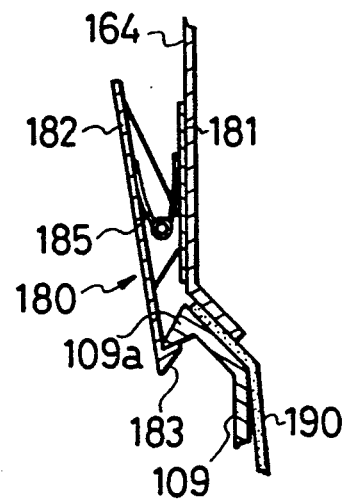
Figure 17:
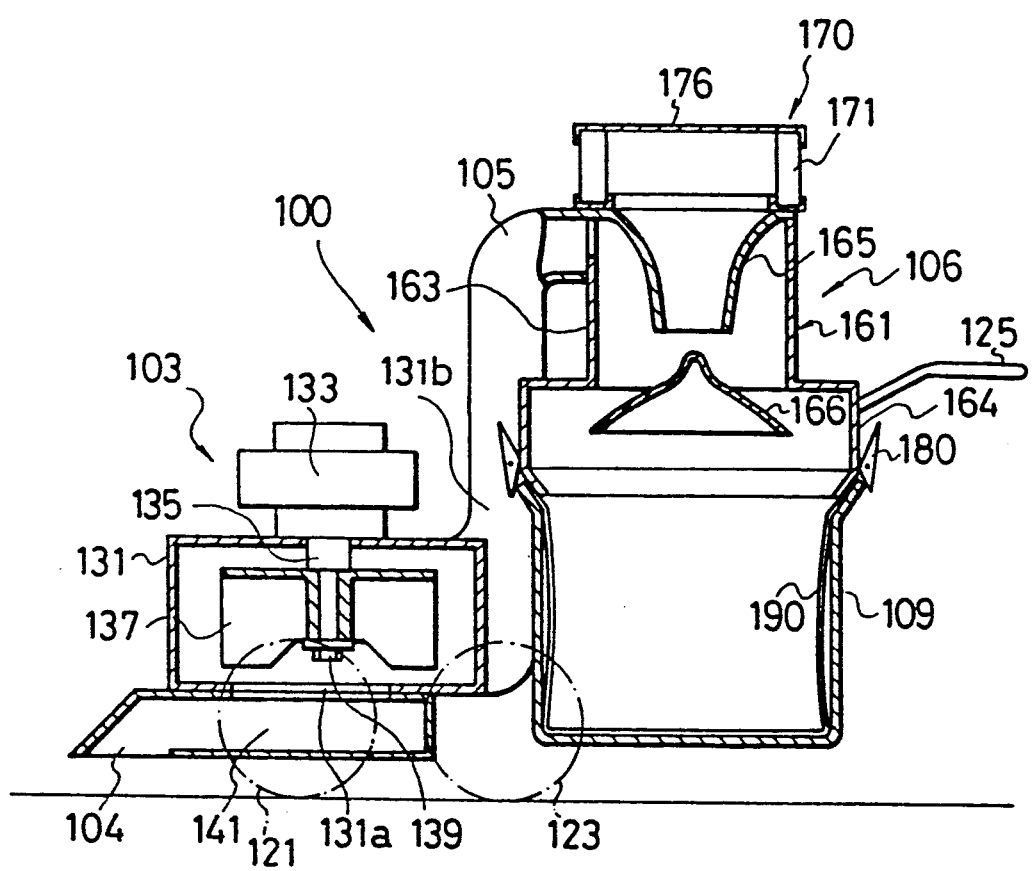
Figure 18:
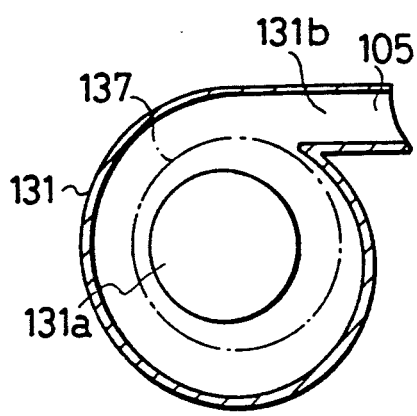
Figure 19:
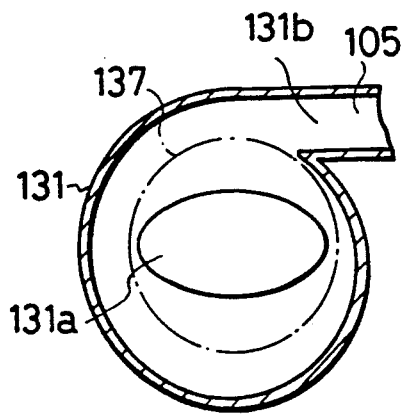
Figure 20:
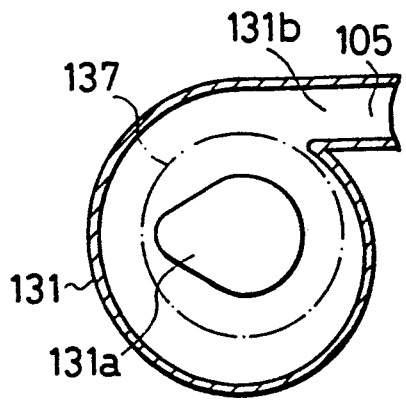
Figure 21:
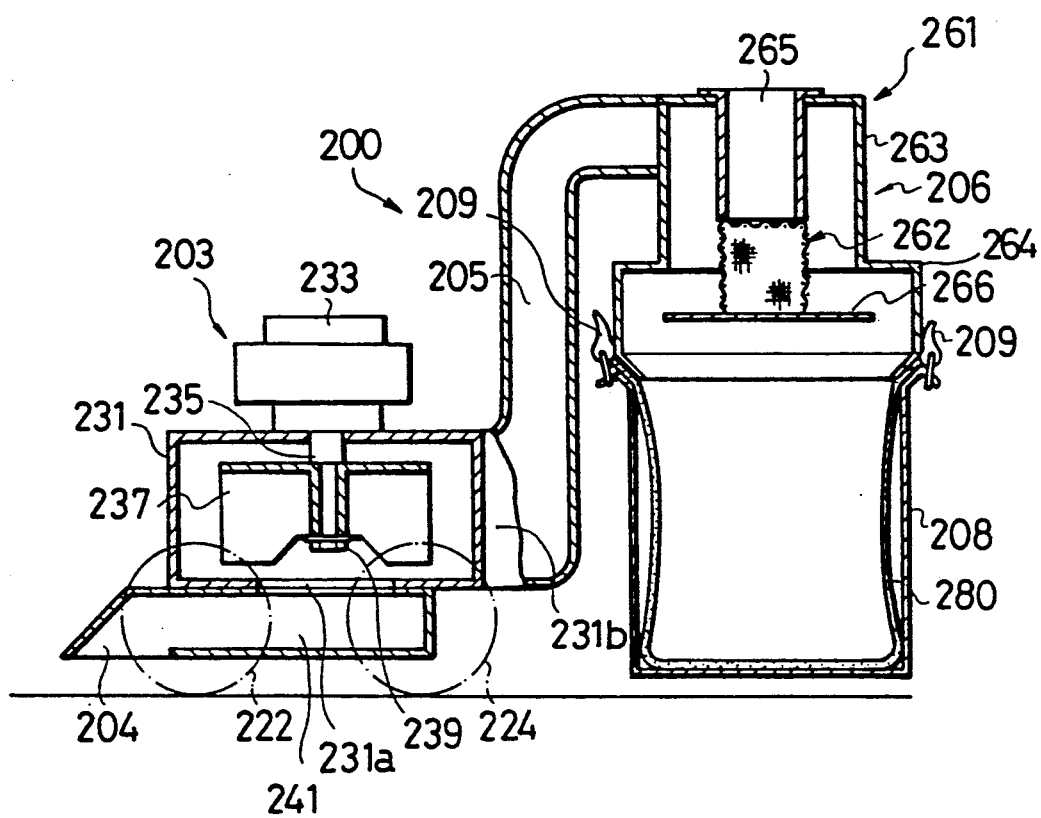
Figure 22:
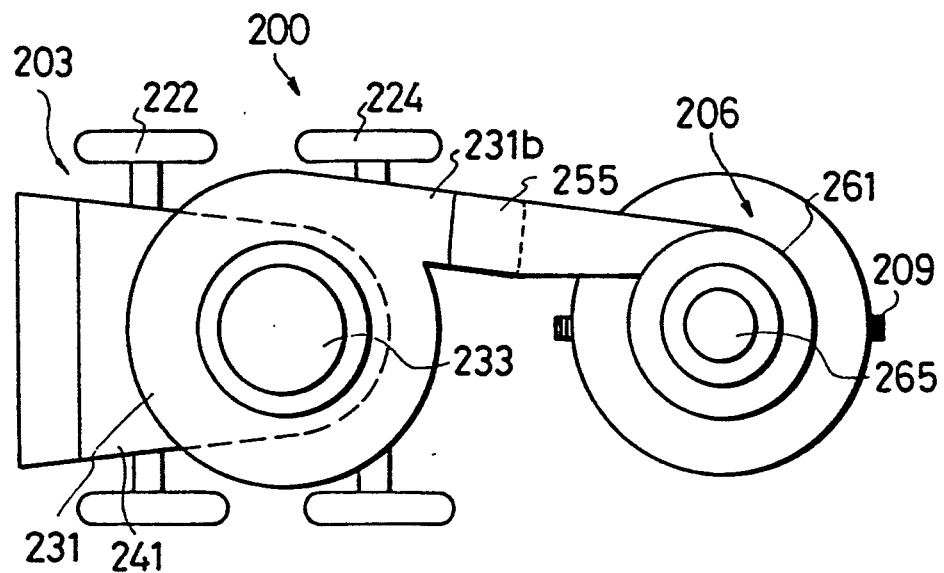
Figure 23:
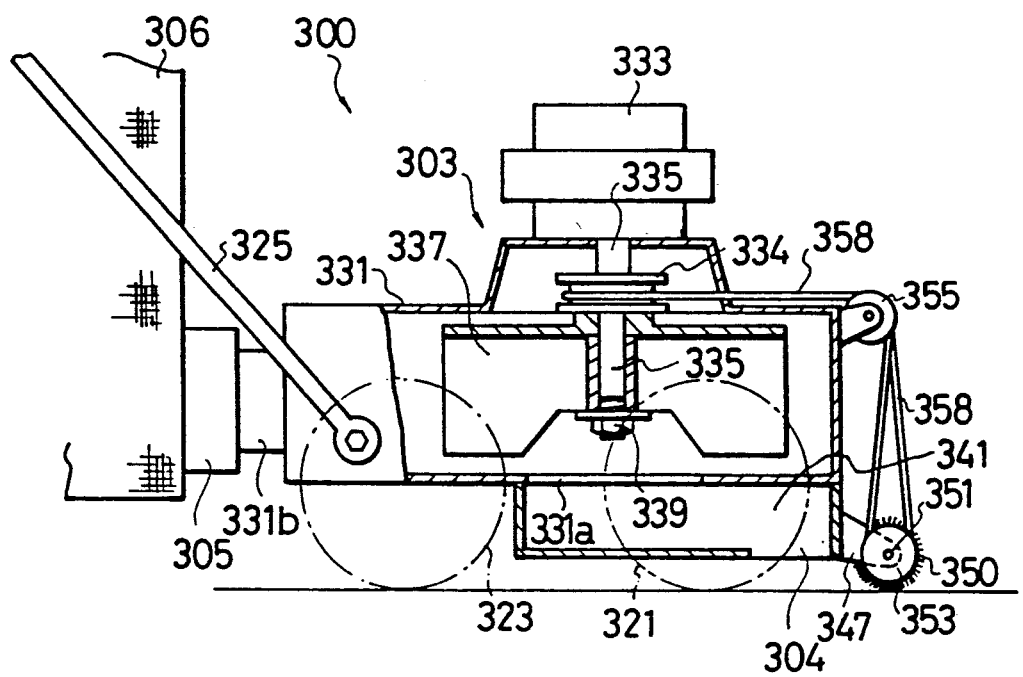
Figure 24:
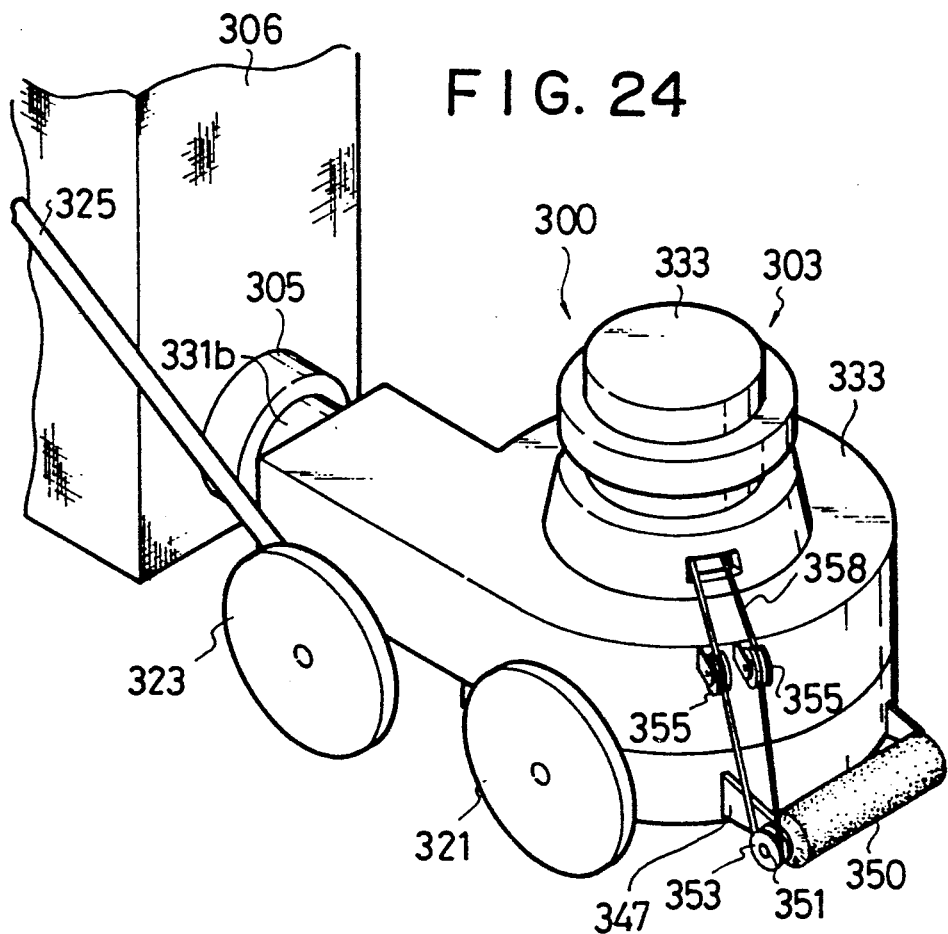
Figure 25:
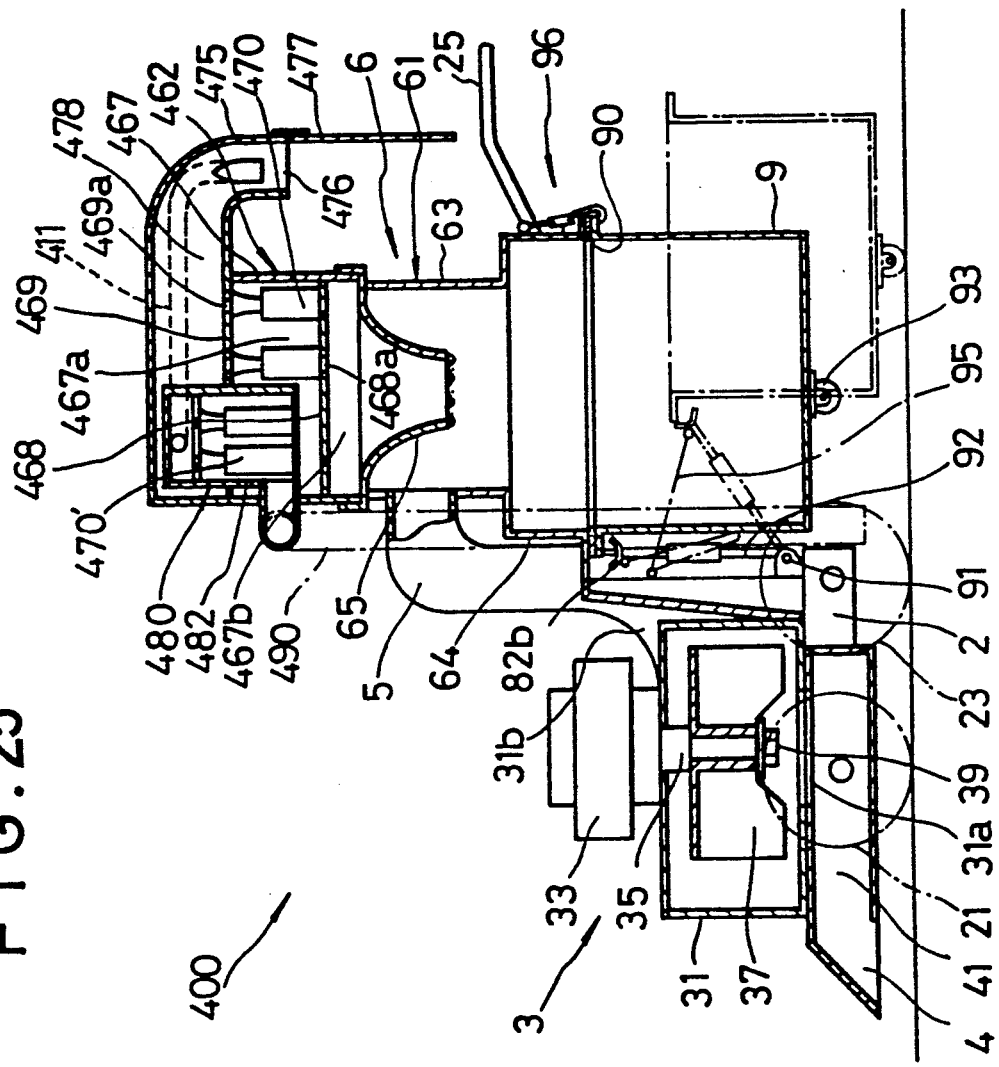
Figure 26:
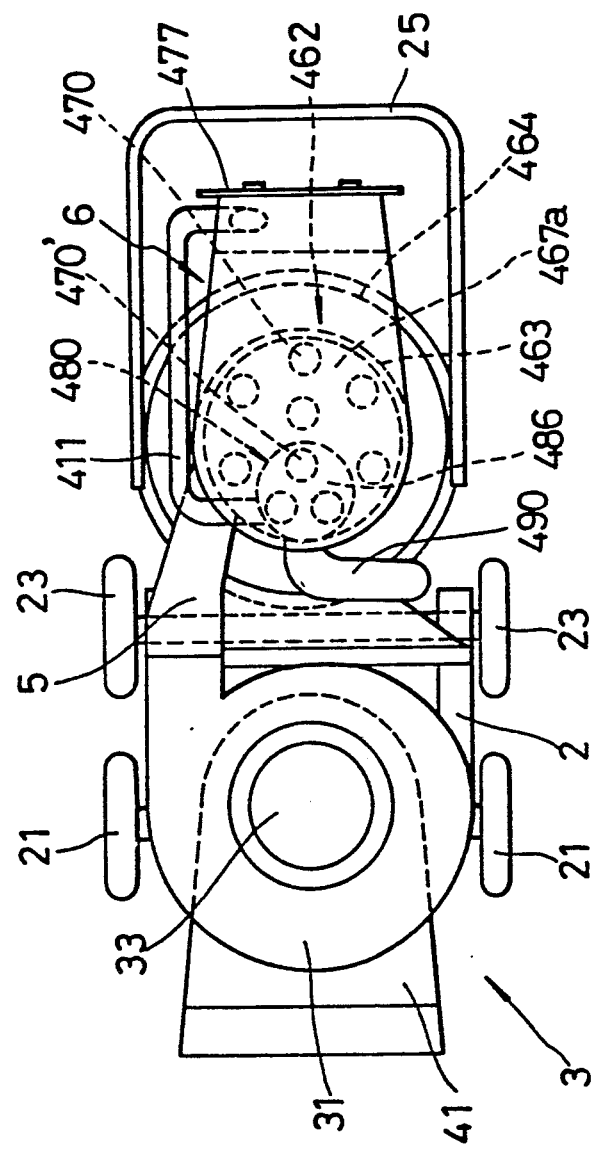
Figure 27:
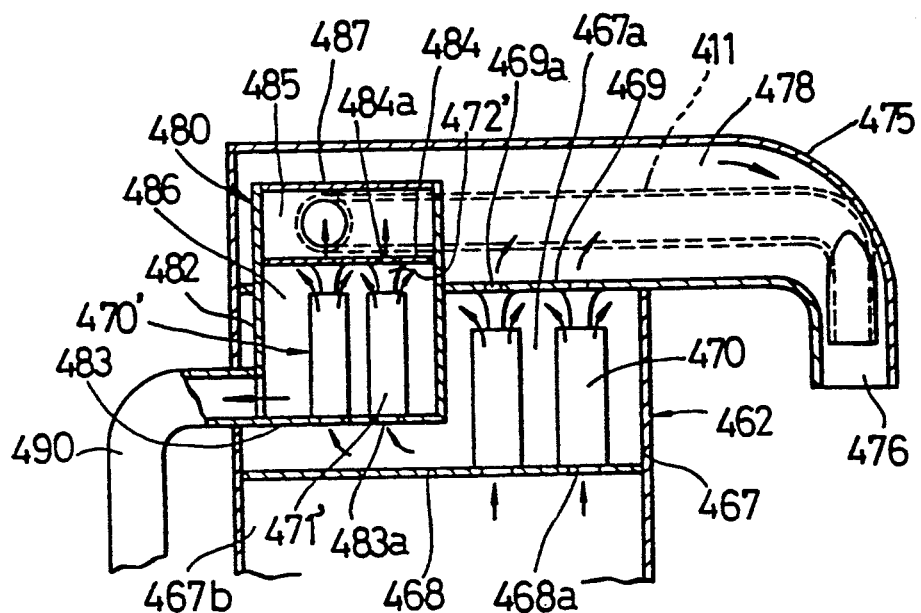
Figure 28:
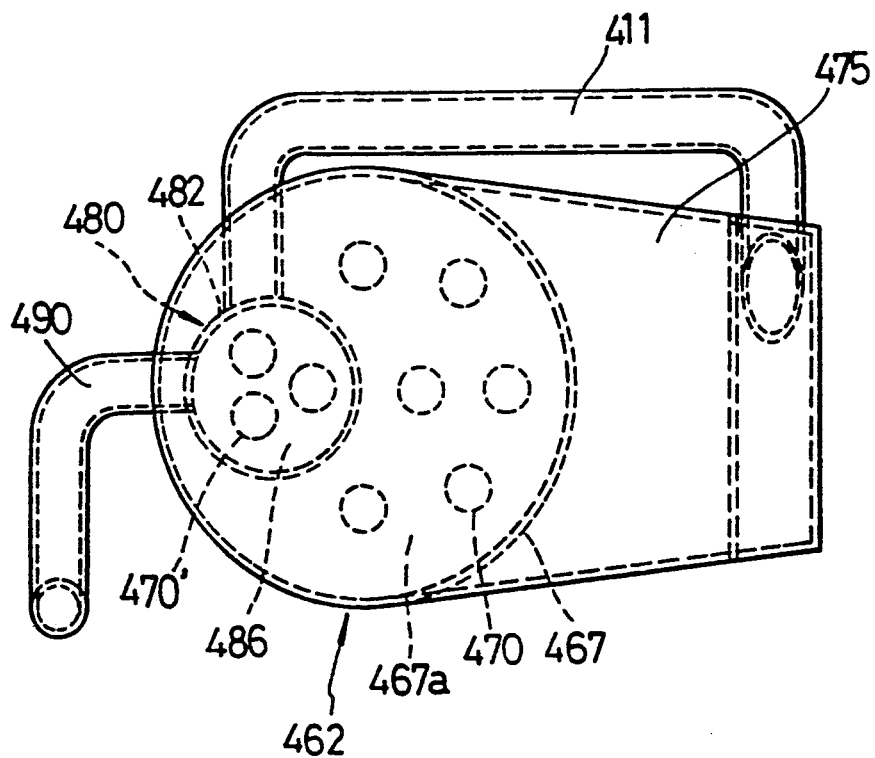
Figure 31:
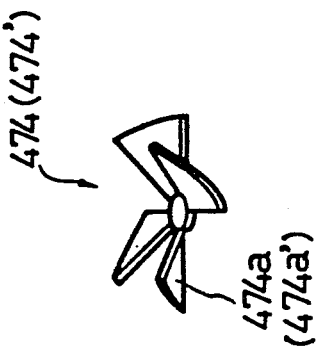
Figure 30:
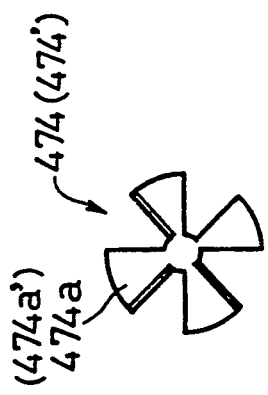
Figure 29:
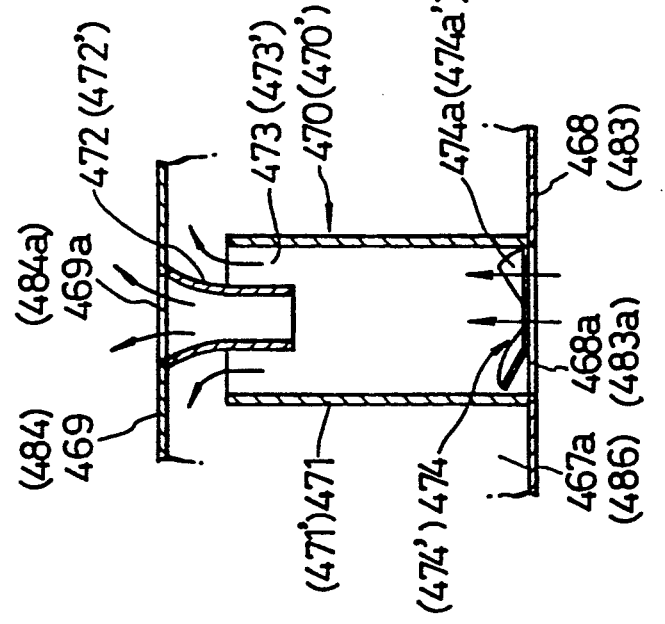

FIG.12 shkows a rear view of the locking mechanism;

FIG. 13 shows a side sectional view of the second embodiment of the this invention;

FIG. 14 shows a plan view of the second embodiment;

FIG. 15 shows a plan view of the filter of the subseparator in the second embodiment;

FIG. 16 shows an enlarged sectional view of the locking mechanism of the dirt receptacle in the second embodiment;

FIG. 17 shows a side sectional view of the third embodiment of this invention;

FIG. 18 shows a plan sectional view of the inlet in the third embodiment;

FIGS. 19 and 20 show a plan sectional view of the modification of the inlet, respectively;

FIG. 21 shows a side sectional view of the fourth embodiment of this invention;

FIG. 22 shows a plan view of the fourth embodiment;

FIG. 23 shows a side sectional view of the fifth embodiment;

FIG. 24 shows a perspective view of the fifth embodiment;

FIG. 25 shows a side sectional view of the sixth embodiment of this invention;

FIG. 26 shows a plan view of the sixth embodiment of this invention;

FIG. 27 shows an side sectional view of the centrifugal dust separators of the sixth embodiment of this invention;

FIG. 28 shows a plan view of the the centrifugal dust separators;

FIG. 29 shows a side sectional view of one of the centrifugal dust separators;

FIG. 30 shows a plan view of the fixed vanes of the the centrifugal dust separator; and FIG. 31 shows a perspective view of the fixed vanes.

DETAILED DESCRIPTION OF THE PREFERRED EMBODIMENTS

The embodiments of this invention will be described below in detail with reference to the accompanying drawings.

FIGS. 1 to 12 show the first embodiment of this invention. As shown better in FIGS. 1 and 2, the cleaning machine 1 of the this invention comprises a frame 2, a suction blower 3 mounted on the frame 2, an intake opening 4 communicating with the suction blower 3, a dirt separator 6 communicating with the suction blower 3 by means of a duct 5, and a dirt receptacle 9, which is detachably attached to the bottom of the dirt separator 6, for collecting the dirt separated in the dirt separator 6.

The frame 2 is provided with front wheels 21 and rear wheels 23 to make the frame 2 movable and a handle 25 for the operator which extends rearward from the frame 2.

The blower 3 is mounted on the front of the frame 2. This blower 3 incudes a housing 31 provided with an inlet 31a and an outlet 31b. An engine 33 is mounted on the top of the housing 31. A fan 37 is secured by a nut 39 on the crank shaft (rotating shaft) 35 of the engine 33, as is rotated about a horizontal axis horizontally by the engine 33.

The intake opening 4 is opened downward near the ground in front of the frame 2. This intake opening 4 communicates with the inlet 31a of the suction blower 3 through an intake duct 41 so as to suck dirt such as fallen leaves, dust and the like with the flow of air generated by roation of the fan 37 of the suction blower 3. The dirt thus sucked is sent out from the housing 31 through the outlet 31b together with the air.

The outlet 31b of the suction blower 3 communicates with the dirt separator 6 situated above the rear of the frame 2 by means of the duct 5. This dirt separator comprises a main separator 61 for separating relatively large dirt such as fallen leaves in the air and a subseparator 62 for separating relatively small dirt such as dust from the air discharged from the main separator.

The main separator 61 comprises a smaller-diameter cylindrical part 63 to which the duct 5 is connected, a larger-diameter cylindrical part 64 concentrically connected to the bottom of the smaller-diameter cylindrical part 63, and a funnel-shaped exhaust guide 65 which extends downward concentrically into the smaller-diameter cylindrical part from the top end. An outlet end 51 of the duct 5 is connected to the upper part of the smaller-diameter cylindrical part 63 along tangential line so that the air from the suction blower 3 whirls along the innewr side of the smaller-diameter cylindrical part 63. The top end of the exhaust guide 65 is bent upright into a cylindrical form and fixed to the top end of the smaller-diameter cylindrical part 63. A conical cover plate 66 is disposed below the exhaust guide 65 with an appropriate spacing between its top end and the bottom end of the exhaust guide 65. The diameter of the bottom of the cover plate 66 is greater than that of the bottom end of the exhaust guide 65. The bottom of the conical cover 66 is held inside the the larger-diameter cylindrical part 64 with an appropriate spacing between its bottom and the inner side of the larger-diameter cylindrical part 64. The top-end of the conical cover 66 extends into the smaller-diameter part 63.

The subseparator 62 is mounted on the top of the main separator 61 with the bottom end fitted in the cylindrical part of the exhaust guide 65. The subseparator 62 comprises a cylindrical filter 70 roatably put on the top end of the exhaust guide 65. A ring packing 68 is inserted between the filter unit 70 and the top end of the exhaust guide 65.

The filter unit 70 comprises a cylindrical filter made by forming a zigzag folded filter material into a ring shape as better as shown in FIGS. 3 to 6. The inner side and outer side of the filter 71 are covered by cylindrical inner and outer side plates 72 and 73 with many holes. The top and bottom sides of the filter 71 are covered by annular channel-section of top and bottom plates 74 and 75, respectively. The top end of the filter unit 70 is held by a circular top cover 76 whose outer edge is bent downward. A handle 78 is attached upright on the top cover 76, whose bottom end 77 protudes downward from the bottom side of the cover 76 into a hole 74a formed at an appropriate place in the top plate 74 of the filter unit 70 as clearly shown in FIG. 5. The ilter unit 70 can be rotated on the exhaust guide 65 by gripping the handle 78 and rotating the top cover 67.

Figure 1:
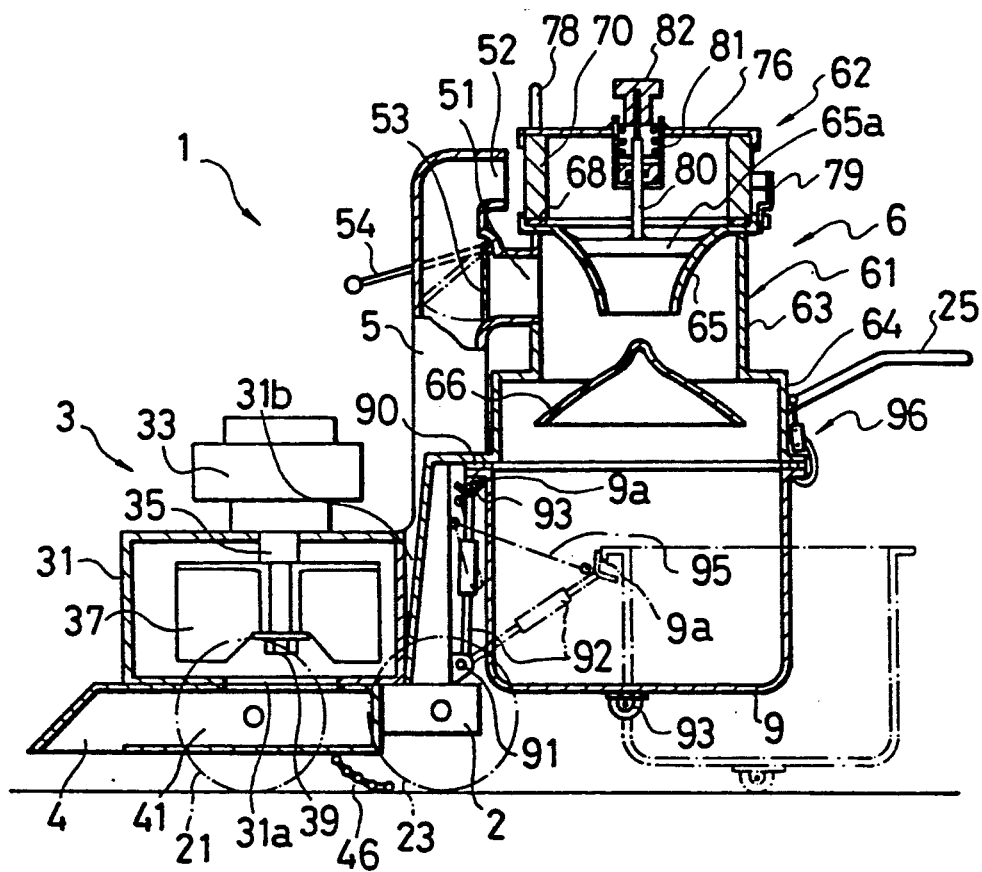
Figure 2:
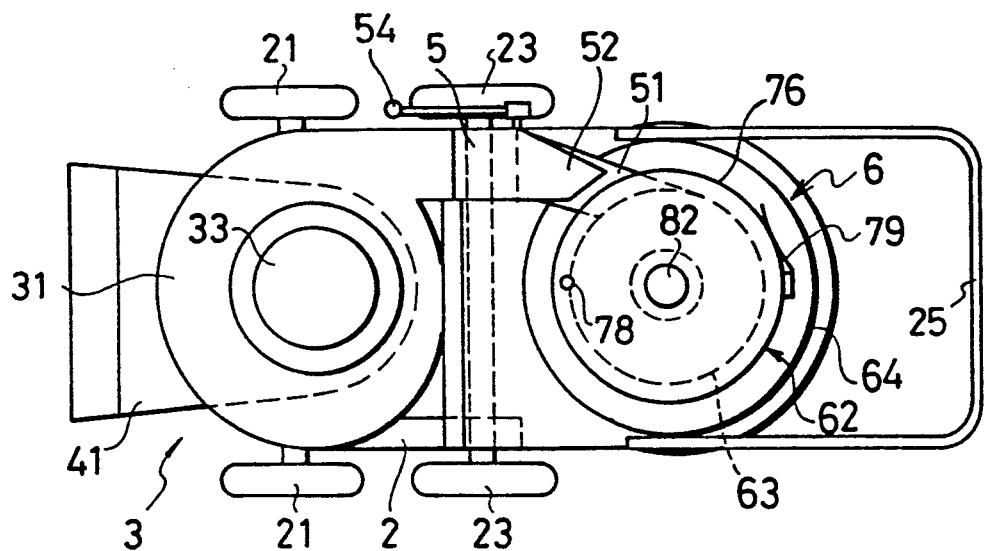
FIG. 2 shows a plan view of the first embodiment.
Figure 5:
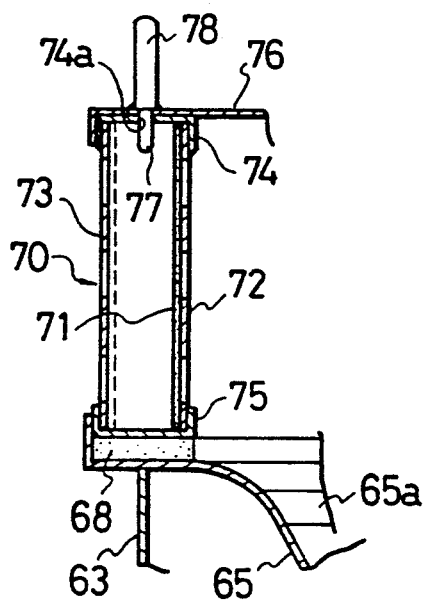
FIG. 5 shows a side sectional view of a part of the filter.
Figure 6:
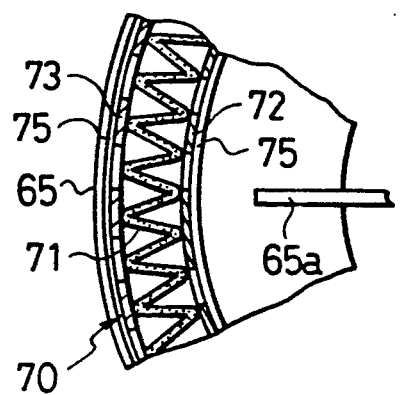
FIG. 6 shows a plan view of a part of the filter.
Figure 7:
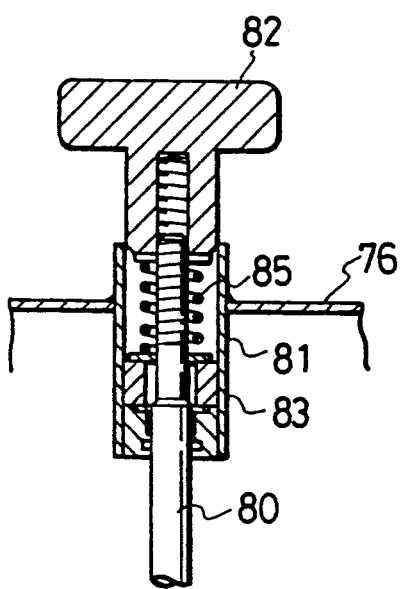
FIG. 7 shows a side sectional view of the handle for securing the filter.
Figure 8:
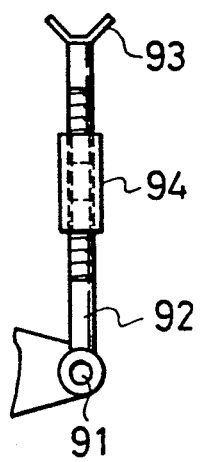
FIG. 8 shows a side view of the pivoting rod for supporting the dirt receptacle in the first embodiment.
Figure 9:
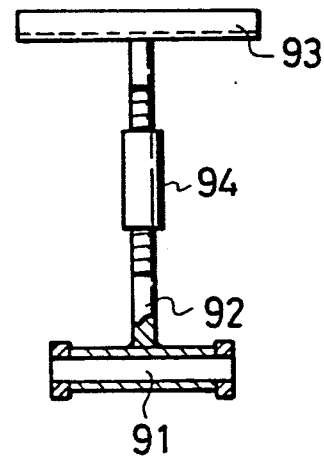
FIG. 9 shows a plan vview of the pivoting rod.
Figure 10:
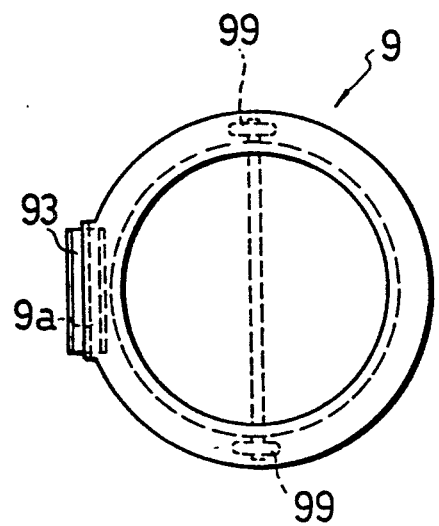
FIG. 10 shows a plan view of the dirt receptacle in the first embodiment.
Figure 11:
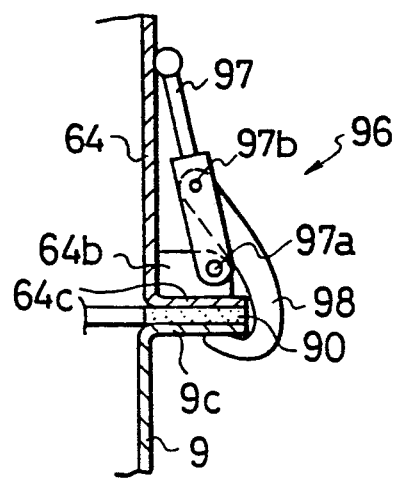
FIG. 11 shows a side view of the locking mechanism detachable securing the dirt receptacle.

A horizontal bracket 65a is trnasversely disposed inside the exhaust guide 65 as shown in FIGS. 1, 5 and 6. Each end of the bracket 65a is fixed on the inner side of the exhaust 65. Fixed upright at the middle point of the bracket 65a is a pin 80, which protrudes above the top cover 67 through a tubular member 81 attached to the center of the top cover 67. The upper part of the pin 80 is threaded and a handle 82 is screwed as shown in FIG. 7. A spring 85 is disposed between the bottom end of the handle 82 and a boss 83 fixed in the tubular member 81 around the pin 80. The top cover 76 is therefore pressed down to the filter unit 70 by the biasing force of the spring 85, and filter unit 70 is then urged against the packing 68.

Figure 3:
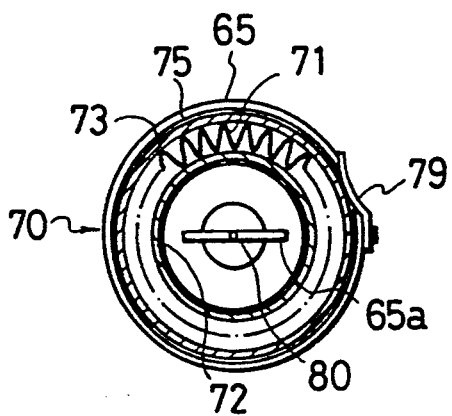
FIG. 3 shows a plan view of the filter of the subseparator in the first embodiment.
Figure 4:
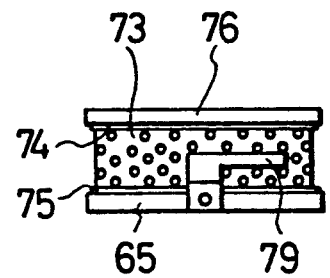
FIG. 4 shows a side sectional view of the filter.

A resilient metal contact strap 79 is attached to the outer surface of the top end of the exhaust guide 65 as better shownb in FIGS. 3 and 4. The contact strap 79 is in contact with the outer side plate 73 of the filter unit 70 so as to discharge the static electricity built up in the filter 71 through the exhaust guitd 65, frame 2, and a ground chain 46 hung down from the intake duct 41.

The duct 5 is p rovided, above the opening 51 communicating with the smaller-diameter cylindrical part 63 of the main separator 61, with a blowing outlet 52 facing the outer side of the filter unit 70 for blowing the dust off the filter 71. Air flow in the duct 5 is selectively directed to the opening 51 or the blowing outlet 52 by a valve 53 which is disposed in the duct 5 and turned by a lever 54.

A cylindrical dirt receptacle 9 made of a material impermeable to air is attached to the bottom end of the larger-diameter cylindrical part 64 of the main separator 61 through a ring packing 90 disposed between as shown in FIG 1. The dirt receptacle 9 is detachably secured to the bottom end of the larger-diameter cylindrical part 64 by the assistance of a pivoting rod 92 whose bottom end is mounted about a pivot shaft 91 on the frame 2 as better shown in the dotted lines in FIG. 1.

That is, the dirt receptacle 9 is provided, at the blower-side of the top end, with a hooking member 9a protruding downwardly. The hooking member 9a is engageable with a V-shaped catch 93 at the top end of the pivoting rod 92. The pivoting rod 92 is equipped at the middle with a turnbuckle 94 for adjusting the length of the pivoting rod 92 as better shown in FIG. 8. Further, the pivoting rod 92 is tied to the frame 2 by means of a chain 95 linked to the top end thereof so as to be pivotable between the first and the second positions. Namely, the pivoting rod 92 supports the dirt receptacle 9 under the bottom end of the larger-diameter cylindrical part 64 at the first position as shown by the solid lines in FIG. 1 and allows the dirt receptacle 9 to land on the ground at the second position as shown by the dotted lines in FIG. 1

The dirt receptacle 9 is secured to the bottom end of the larger-diameter cylindrical part 64 by a locking mechanism 96 disposed at the rear side of the bottom end of the larger-diameter cylindrical part 64. The locking mechanism 96 comprises a lever 97 whose bottom end is mounted about a pivot pin 97a supported by brackets 64b on the flange 64a of the larger-diameter cylindrical part 64 and a hook 98 whose top end is mounted about a pin 97b at the middle of the lever 97. The bottom end of the hook 96 is so formed as to hook the bottom side of the flange 9c at the top end of the dirt receptacle 9. When the lever 97 is pushed up, the hook 96 pulls up the flange 9c and presses it against the packing 90.

Further, the dirt receptacle 9 is equipped with a plurality of wheels 99 for making the receptacle 9 movable on the land, when it is detached from the bottom end of the larger-diameter cylindrical part 64.

In the above embodiment, dirt and air from the intake openeing 4 is blown into the smaller-diameter cylindrical part 63 of the main separator 61 through the outlet 31b of the suction blower 3, the duct 5, and the openi-ng 51 of the duct 5. The dirt therein swirls with the air, and the large dirt moves toward the side wall of the main separator 61 by the centrifugal force, descends through the space between the conical cover 166 and the larger-diameter cylindrical part 64, and falls into the dirt receptacle 9. On the other hand, relatively small dirt such as dust enters the exhaust guide 65 and then the subseparator 62 by the air. There, the dust is caught by the filter unit 70.

When the filter 71 is clogged with the dust, the operator turns the lever 54 of the valve 53 and lets the air from the suction blower 3 blow out from the blowing outlet 52 against the filter unit 7. Then by loosening the handle 82 and turning the filter unit 70 by gripping the handle 78, the entire circumference of the filter unit 70 can be blown by the air. Thereby the dust clogged to the filter 71 is blown off and falls into the dirt receptacle 9.

To take out the dirt tus collected in the dirt receptacle 9, the operator pulls down the lever 97 of the locking mechanism 96 rearward to unlock. While holding the flange 9c by hands, the operator unhooks the hook 96 from the flange 9c of the dirt receptacle 9 and pulls the dirt receptacle 9 rearward. The pivoting rod 82 then turns from the first position to the second position and the dirt receptacle 9 is brought down on the ground. Since the dirt receptacle 9 is movable on wheels 99, the dirt collected in the dirt receptacle can easily be carried and discarded.

To attach the dirt receptacle 9, the operator first engages the hooking member 9a at the front side of the dirt receptacle 9 with the catch 93 at the top of the pivoting rod 92 held at the second position and then pushes the dirt receptacle 9 frontward by lifting the rear side thereof. The pivoting rod 92 then turns frontward to the first position and presses the dirt receptacle 9 to the bottom end of the larger-diameter cylindrical part 64. While holding the dirt receptacle 9 at this position, the operator turns the lever 97 of the locking mechanism 96 to secure by the hook 96 the dirt receptacle 9 to the bottom end of the larger-diameter cylindrical part 64.

In this embodiment, the dirt receptacle 9 can be easily attached and detached by the operator alone. Thus this embodiment can improve the efficiency of work and reduce the fatigue of the operator.

Further, in this embodiment, the dirt receptacle 9 but may be square or any other form in section.

Furthermore, two or more pivoting rods or locking mechanisms may be used.

Moreover, detaching the dirt receptacle can be made easier by constructing the pivoting rod and the dirt receptacle so that when the hooking member is unhooked, the dirt receptacle can be turned with respect to the catch of the pivoting rod to the second position in such a manner that the dirt receptacle is supported on the wheels, and then pulled rearward. Further, attaching and detaching of the dirt receptacle be made much easier by the construction wherein the front and rear parts of the dirt receptacle are supported on two pivoting rods, respectively, and the dirt receptacle is lifted by the assistance of the two pivoting rods to the attached position by pushing it frontward.

Further, a centrifugal dust separator may be used for the subseparator instead of the filter as described above and a filter type separator may also used for the main separator instead of the centrifugal type separator as described above.

FIGS. 13 to 15 show the second embodiment of the this invention. In this embodiment, the dirt receptacle detachably attached under the dirt separator is so constructed that a dirt bag made of a material impermeable to air is additionally disposed inside and provided with air holes at the bottom of the dirt receptacle. According to this embodiment, collected dirt can be easily taken out from the dirt receptacle by removing the dirt bag containing the dirt. Further, when having attached the dirt receptacle with a new dirt bag to be put in and starting the engine, the air between the receptacle and the bag flows through the air holes and the dirt bag is automatically filled out to fit the inner side of the dirt receptacle by a higher air pressure inside the machine. Thus the dirt bag can be set easily and quickly. The detailed description of this embodiment is as follows.

In FIGS. 13 to 15, reference numeral 100 designates the cleaning machine of the second embodiment and 103 designates a suction blower. This cleaning machine 100 is movable by front wheels 131 and rear wheels 132 and can be steered by the operator by means of a handle 125 disposed at the rear.

The construction of the suction blower 103 is the same as in the first embodiment. That is, the suction blower 103 has a housing 131 provided with an inlet 131a and an outlet 131b. Mounted on the top of the housing 131 is an engine 133. The crank shaft (rotating shaft) 135 of the engine 133 protrudes inside the housing 131 and a fan 137 is secured on the bottom end thereof by a nut 139. The fan 137 is rotated about a horizontal axis by the engine 133.

Disposed below the suction blower 103 is an intake opening 104 which is opened downward close to the ground. This intake opening 104 is communicated with the inlet 131a of the suction blower 103 through an intake duct 141 so as to suck dirt on the ground along with air by the sucking force generated by rotation of the fan 137 of the suction blower 103. The dirt is discharged from the housing 131 through the outlet 131b together with the air.

The outlet 131b of the suction blower 103 communicates with a dirt separator 106 situated behind the suction blower 103 by means of a duct 5. The dirt separator 106 comprises a main separator 161 for separating relatively large dirt from the air and a subseparator 162 for separating relatively small dirt from the air which has passed through the main separator 161.

The construction of the main separator 161 is the same as in the first embodiment. The subseparator 161 is mounted on the main separator 161 in the same way as in the first embodiment. That is, a cylindrical filter unit 170 is rotatably put in the cylindrical part at the top end of the exhaust guide 165.

The filter unit 170 comprises a cylindrical filter made by forming a zigzag folded filter material into a ring shape as shown in FIG. 15. The top side of the filter unit 170 is held by a top cover 176.

A cylindrical dirt receptacle 109 made of a material impermeable to air is detachably attached to the bottom end of the larger-diameter cylindrical part 164 of the main separator 161 by means of clamps 180 oppositely disposed on the outer side of near the bottom end of the larger-diameter cylindrical part 164. The dirt receptacle 109 is provided with a plurality of air holes 109a in the bottom. A dirt bag 190 made of a material impermeable to air is put in the dirt receptacle 109 with the top end held between the bottom end of the larger-diameter cylindrical part 164 and the top end of the dirt receptacle 109.

Each clamp 180 comprises a base plate 181 fixed on the outer side near the bottom end of the larger-diameter cylindrical part 164 and a lever 182 pivotably mounted on the base plate 181. The bottom end of the lever 182 is formed into a hook 183. The lever 182 is urged by a spring 185 in the direction in which the hook 183 engages with a hanging projection on the top end of the dirt receptacle 109.

In the above embodiment, dirt sucked from the intake opening 104 is blown into the main separator 161 through the outlet 131b of the suction blower 103 and the duct 105. The dirt swirls in the main separator 161 with the air, and the large dirt moves toward the side wall of the main separator 161 by the centrifugal force, falls through the space between the conical cover 166 and the larger-diameter cylindrical part 64, and is collected in the dirt bag 190.

To take out the dirt in the dirt receptacle 109, the operator tilts the cleaning machine 101 by pushing down the handle 125 until the bottom of the dirt receptacle 109 comes into contact with the ground, then releases the dirt receptacle 109 from the clamps 180 by pressing the lever 182. Next the operator pulls up the handle 125, then the dirt receptacle 109 separates from the bottom end of the larger-diameter cylindrical part 164. Finally the operator moves the cleaning machine 1 forward, then the dirt receptacle 109 is left behind and the dirt bag 190 can be taken out.

After having attached the dirt receptacle 109 with a new dirt bag 190 and starting the engine 133, the air between the receptacle 109 and the bag 190 flows out through the air holes 109a and the dirt bag 190 is automatically filled out to fit the inner side of the dirt receptacle 109 by a higher air pressure inside the machine. Further, even if there is a small hole in the bag and air leaks through the hole between the bag and the receptacle, the air is expelled through the air holes 109a without causing the bag to swell inward off the receptacle 109, flutter out of the receptacle, or block the exhaust passage. In addition, since water flows out from the air holes 109a, washing of the dirt receptacle 109 is made easier.

FIGS. 17 to 20 show the third embodiment of the this invention. In the first and second embodiments described above, the inlet of the suction blower in the housing is formed into a circular shape concentric with the axis of rotation of the fan. With this construction, a discarded can sucked in is sometimes caught between the part of the housing around the inlet and the fan and revolves around the air intake along with the fan, which damages the blades of the fan or causes a malfunction by overloading.

In this embodiment, the shape of the inlet is deformed from the circular shape as described above to the shape in which a can caught between the inner edge of the housing defining the inlet and the fun is automatically disengaged therefrom during the revolution of the fan. Specifically, the inner edge of the housing is so formed as to have at least a part against which the caught can is hit during the revolution of the can along with the fan, causing the can to drop down into the intake duct or to be drawn again through the inlet.

The other construction of this embodiment is substantially the same as that of the second embodiment. Therefore, the same components are designated the same reference numerals as in the second embodiment and the detailed description of them is omitted.

FIG. 17 shows a side sectional view of the cleaning machine 100 of this embodiment. The construction is the same as that in FIG. 13 except that the dirt receptacle 109 has no air holes. FIG. 18 shows a sectional view of the suction blower 103 of this embodiment. The suction blower 103 communicates with a dirt intake 104 which is disposed below the suction blower 103 and opens close to the ground through an inlet 131a formed in the housing 131 and an intake duct 141. The inlet 131a has an eccentric circular shape whose center is deviated from the axis of rotation shaft 135 of the fan 137 so as to have an extended part as shown in FIG. 18.

In the above embodiment, if a can is sucked in and caught between the inner edge of the housing 131 defining the inlet 131a and the fan 137 without passing through the fan, it revolves along with the fan 137 and hits against the inner edge of the housing forming the extended part of the inlet 131a during the revolution of the fan, dislodging the can, which then falls down into the intake duct 141 or is sucked again through the inlet 131a.

FIG. 19 shows a modification of this embodiment. The shape of the inlet 131a of this modification has an elliptical shape symmetric with respect to the axis of the fan 137. The two opposite parts of the ellipse shape inlet are extended to near the circumference of the fan 137.

FIG. 20 shows another modification of this embodiment. The inlet 131a of this modification is formed into such a shape that a part of the circumference of a circle centered at the axis of the fan 137 is extended outward to near the circumference of the fan 137.

In the above embodiments, even if a can sucked in is caught between the fan and the inner edge of the housing, as the can rotates, it will hit the extended portion of the housing inner edge, and then fall into the intake duct or may be drawn again into the suction blower. The above embodiments can prevent damages which is caused by the can caught between the fan and the inner edge of the housing.

FIGS. 21 and 22 show the fourth embodiment of the this invention. This embodiment is characterized in the construction of the dirt separator. That is, in this dirt separator, a duct communicating with the outlet of the suction blower is connected to a cylindrical part of the main separator along a tangential line thereof, a cylindrical exhaust guide provided with a subseparator thereon is disposed concentrically inside the upper part of the cylindrical part, and a circular cover plate is disposed under the subseparator.

As shown in FIG. 21, the cleaning machine 200 of this embodiment has a suction blower 203 having an housing 231 with an inlet 231a. An engine 233 is mounted on the housing 231 of the suction blower 203. The crank shaft 235 of the engine 233 protrudes downward inside the housing 231. A fan 237 is secured by a nut 239 on the crank shaft 235 and rotates horizontally by the engine 233. An intake opening 204 is opened downward close to the ground below the suction blower 203. The intake opening 204 is communicated with the inside of the housing 231 through an intake duct 241 and the inlet 231a of the housing 231.

The housing 231 is provided at the rear part thereof with an outlet 231b for blowing out dirt along with air. The outlet 231b communicates with a dust separator 206 situated behind the suction blower 203 through a duct 205. Disposed below the suction blower 203 are front wheels 222 and rear wheels 224.

The dirt separator 206 comprises a main separator 261 for separating relatively large dirt from the air and a subseparator 262 for catching dust in the air.

The main separator 261 comprises a smaller-diameter cylindrical part 263 and a larger-diameter cylindrical part 264 connected to the bottom of the smaller-diameter cylindrical part 263. Connected to the smaller-diameter part 263 is the duct 205 so that the air from the suction blower 203 flows into the smaller-diameter cylindrical part 263 along a tangential line thereof. Inside the upper part of the smaller-diameter cylindrical part 263, a cylindrical exhaust guide 265 is disposed concentrically.

The subseparator 262 is attached at the bottom end of the exhaust guide 265. The subseparator 265 is wire mesh formed into a cylinder having substantially the same diameter of the exhaust guide 265. A circular cover plate 266 is disposed below the subseparator 262 at about the middle of the larger-diameter cylindrical part 264 with an appropriate space between the circumference thereof and the inner side of the larger-diameter cylindrical part 264. The cover plate 266 prevents the dirt collected in a dirt receptacle 208 below from flying up and being pressed over the outer surface of the subseparator 262.

The dirt receptacle 208 made of wire mesh is detachably secured to the bottom end of the larger-diameter cylindrical part 264 by means of clamps 209. A dirt bag is set in the dirt receptacle 208 with the top end pressed between the bottom end of the larger-diameter cylindrical part 263 and a sealing means such as rubber or sponge affixed to the inner side of the top end of the dirt receptacle 2083.

In the above embodiment, dirt sucked together with air from the intake opening 204 by the suction blower 203 is discharged from the outlet 231b of the housing 231 along with the air, passes through the duct 205, and enters the smaller-diameter cylindrical part 263 of the main separator 261 in a tangential direction thereof. The dirt therein rotates with the air and while rotating it moves toward the sidewall of the smaller-diameter cylindrical part 263. Thus, relatively large dirt such as fallen leaves and pieces of waste paper falls through the space around the cover plate 266 and into the dirt receptacle 208, while small dust is separated from the air by the wire mesh of the subseparator 262 when the air flows into the exhaust guide 265. The substantially dust-free air is discharged outside from the top end of the exhaust guide 265.

According to the above embodiment, the collected dirt can be easily taken out and discarded in a bag; the dirt receptacle is light and easy to handle; and the dirt bag is automatically filled out to fit the inner side of the dirt receptacle by a higher air pressure inside the machine.

In the construction of the above embodiment, the exhaust guide 265 may be formed into the shape of a funnel. The subseparator 262 may be a filter made of a filter material other than wire mesh or a centrifugal separator. The subseparator may also be disposed above the exhaust guide 265. Further, the dirt receptacle may be made of a material impermeable to air such as plastics.

FIGS. 23 and 24 show the fifth embodiment of the this invention. In this embodiment, a pulley is mounted to the crank shaft. Put on the pulley is a endless belt for transmitting a driving force of the engine to a rotating brush disposed in front of the dirt intake opening or to the wheels of the machine.

As shown in FIGS. 23 and 24, the cleaning machine 300 of this embodiment is provided with a suction blower 303. The suction blower 303 comprises a housing 331, an engine 333 and a fan 337. The engine 333 is mounted on the housing 331. The crank shaft 335 of the engine 333 protrudes downward inside the housing 331. A pulley 334 is mounted to the base of the crank shaft 335. The fan 337 is mounted to the bottom end of the crank shaft 335 and secured by means of a nut 339. Disposed below the suction blower 303 are front wheels 321 and rear wheels 323 for making the machine movable. A handle 325 for steering the machine is extended rearward from the rear part of the suction blower 303.

Disposed below the suction blower 303 is a dirt intake 304, which is opened downward close to the ground. The dirt intake 304 is communicated with the housing 331 through an inlet 331a in the bottom side of the housing 331. Provided at the rear part of the housing 331 is an outlet 331b. Connected to the outlet 331b is a duct 305, which is then connected to a dirt separator 306 and a dirt receptacle (not shown) behind the suction blower 303.

A rotary brush 350 is horizontally supported by a pair of bracket plats 347 so as to be in contact with the ground. A pulley 353 is secured on one end of the shaft 351 of the rotary brush 350. Two idle pulleys 355 are mounted on the front part of the housing 331 of the suction blower 303. A endless flexible belt 358 is passed about the pulley 334 on the crank shaft 335 on the engine and the pulley 353 of the shaft 351 of the rotary brush 350 and guided by the idle pulleys 355 on the housing 331.

With the above embodiment, the operator starts the engine 333 and steers the machine gripping the handle 325. When the engine 333 is rotating, the fan 337 of the suction blower 303 rotates and generates a powerful sucking force. Dirt such as fallen leaves and dust is sucked by this sucking force from the dirt intake 304 together with air, blown into the dirt separator 306, and there separated from the air and collected in the dirt receptacle.

Rotation of the engine 33 is also transmitted to the rotary brush 350 by means of the belt 358, and the rotary brush 350 rotates. The rotary brush 350 gathers and stirs up dirt and dust toward the dirt intake 304, which increases the cleaning ability.

In the above embodiment, the rotary brush may be so disposed as to rotate around a vertical rotating shaft. Further, the belt 358 may also be used to drive wheels.

FIGS. 25 to 31 show the sixth embodiment of this invention.

The cleaning machine 400 of this embodiment differs from the first embodiment by the type of the dust separator used for the subseparator, which in this embodiment is a centrifugal type dust separator removing relatively small dirt such as dust by a centrifugal force. The other construction is almost the same as that of the first embodiment. Then the same components are designated with the same reference numerals as in the description of the first embodiment, by doing so the detailed description of those components are omitted.

In this embodiment, as shown in FIG. 25, a first subseparator 462 is disposed above the main separator 61. The first subseparator 462 includes a cylindrical separating chamber 467. This separating chamber 467 is partitioned into a upper chamber 467a and a lower room 467b by a bottom plate 468 with a plurality of holes 468a formed therein. The top end of this separating chamber 467 is defined by a top plate 469.

Situated in the upper chamber 467a of the separating chamber 467 are a plurality of centrifugal dust separators 470. Each of the centrifugal dust separator 470 includes a cylindrical outer guide 471 extending upwardly from the bottom plate 468 as shown in the FIGS. 29 to 31.

The bottom end of the outer guide 471 encloses one of the holes 468a in the bottom plate and communicates with the exhaust guide 65 through the hole in FIGS. 29 to 31. The top end of the outer guide 471 is open in the upper chamber 467a. The bottom end of a funnel-shaped inner guide 472 is disposed within the upper part of the outer guide 471, forming an annular space 473 therebetween. The top end of the inner guide 472 encloses one of the holes 469a formed in the top plate 469 right above each outer guide 471. A swirl vane 474 which has four radial vane member 474 slanted with respect to the centrifugal direction is disposed in the bottom end of the outer guide 471. The air which flows into each centrifugal dust separator 470 is rotated as it passes through the swirl vane 474.

Further, partially disposed in the separating chamber 467 of the first subseparator 462 is the second subseparator 480 as better shown in FIG. 27.

As clearly shown in FIG. 27, the second subseparator 400 includes a cylindrical separating chamber 480. The separating chamber 480 is defined by the cylindrical side wall, a bottom plate 483 with a plurality of holes 483a formed therein, a partition plate 484 which divides the chamber 480 into an upper chamber 485 and a lower room 486, and a top plate 487. The bottom plate 483 is elevated at an appropriate height from the bottom plate 468 of the first subseparator 462 so that the first side stream, which is the dust-laden air stream discharged from the first centrifugal separators 470 into the upper room 467a of the first subseparator 62 the centrifugal separators 470, small dirt such as dust separated by the centrifugal separator 470, enters the second subseparator 480 through the holes 483a in the bottom plate 483.

Disposed in the lower chamber 486 are a plurality of second centrifugal dust separators 470'. The construction of the each second centrifugal dust separators 470' is the same as that of the first centrifugal dust separators 470. That is, each of the second centrifugal dust separator 470' has a cylindrical outer guide 471' extending upwardly from the bottom plate 483. The bottom end of the outer guide 471' encloses one of the holes 483a in the bottom plate 483 and communicates with the upper chamber 467a of the first subseparator 62 as shown in FIGS. 29 to 31. The top end of the outer guide 471' is open in the lower room 486. The bottom end of a funnel-shaped inner guide 472' is disposed within the upper part of the outer guide 471', forming an annular space 473' therebetween. The top end of the inner guide 472' encloses one of the holes 484a formed in the partition plate 484 right above each outer guide 471' and communicates with the upper room 485. A swirl vane 474' which has four radial vane members 474a' slanted with respect to the centrifugal direction is disposed in the bottom end of the outer guide 471' in such a manner that the air which enters the outer guide 471' is rotated as it passes through the swirl vane 474'.

As clearly shown in FIGS. 27 and 28, a dust discharging duct 490 is connected to the lower chamber 486. The other end of the dust discharge duct 490 is opened downward close to the ground. An exhaust duct 411 is connected to the upper chamber 485. The other end of the exhaust duct 411 opens into the hood 475 near the outlet 476 obliquely to the direction in which the air flows out.

In the above embodiment, dirt and air from the suction blower 3 is blown into the smaller-diameter cylindrical part 63 of the main separator 61 through the outlet 31b of the housing and the duct 5 along with the air. There the dirt mores toward the side wall of the cylindrical parts 63 and 64 by a centrifugal force. Thus relatively large dirt such as fallen leaves falls into the dirt receptacle 9. The air, still containing dust not removed in the main separator, flows into the first subseparator 462 through the exhaust guide 65. There, the relatively small dust is separated by the centrifugal dust separator 470. That is, the air which enters the outer guide 471 of each centrifugal dust separator 470 through the hole 468a is rotated as it flows upward through the swirl vane 474. The dust in the air moves toward the side wall of the outer guide 471 by centrifugal force, and then flows upward through annular space 473 into upper chamber 467a as the first side flow. The substantially dust-free air flows out into the inner guide 472, and constitutes the first main flow. This main stream then flows outside from the outlet 476 of the hood 475.

The first side flow then enters the centrifugal dust separators 470' of the second subseparator 480 and is further separated into the dust-laden second side flow and the substantially dust-free second main flow. The second side flow enters the lower room 486 and is discharged through the dust discharging duct 490. The second main flow enters the upper chamber 485, flows out from the upper chamber 485 through the exhaust duct 411 into the hood 485 with the assistance of a decreased pressure caused by the first main flow in the hood 475. The combined first and second main flows are then discharged through outlet 476.

In this sixth embodiment, since a centrifugal type dust separator is used for the subseparator, the problems associated with a filter such as clogged mesh can be eliminated. Further, by repeating the separation of small dirt twice by the first and second subseparators, separation of small dirt from the main flow can be considerably improved. Further, by this repeated separations, the amount of the air discharged with the small dust is reduced up to 4 percent of the amount sucked in. Therefore, filtration of small dirt is made easier when further collecting the small dirt by a filter means, and dispersion of small dirt is suppressed when discharging it on the ground.

The second subseparator may be disposed separately from the first subseparator by connecting them with an appropriate conduit, or may be omitted.

Further, the first subseparator can be employed in this embodiment without providing the second subseparator.

It should be understood that the spirit and scope of the present invention are never limited by the particular embodiments described above and are defined only by the appended claims.

What is claimed is:

1. A cleaning machine comprising:
   a frame:
   a suction blower mounted on the frame and having an inlet and an outlet, for generating an air flow for entraining dirt in an air stream, and for drawing the air-entrained dirt into the cleaning machine;
   an intake opening communicating with the inlet of the suction blower for receiving the air stream and entrained dirt, including relatively large dirt and relatively small dirt such as dust;
   a main separator for receiving the air stream and entrained dirt from the suction blower outlet, and for separating the relatively large dirt from the air stream and for discharging the air stream and entrained dust;
   a subseparator for receiving the air stream and entrained dust discharged from the main separator, and for separating the dust from the air stream;
   a dirt receptacle made of an air-impermeable material detachably attached under the main separator for receiving the dirt separated from the air stream, the dirt receptacle having an upper edge defining an opening, the upper edge having a catch portion;
   a pivoting rod having top and bottom ends, the pivoting rod being pivotally mounted at its bottom end to the frame, and being engageable at its top end with the catch portion of the receptacle;
   a clamp for detachably securing the dirt receptacle by its upper edge to the main separator, the clamp located at a position opposite the dirt receptacle catch portion, whereby the dirt receptacle is detachably secured to the main separator; and
   the pivoting rod, while being engaged at its top end with the receptacle upper edge catch portion, being pivotable between a first position in which the pivoting rod supports the dirt receptacle under the main separator and a second position in which the receptacle is removed from the main separator to land on the ground at a point which is laterally displaced from the first receptacle position.

2. The cleaning machine as claimed in claim 1, wherein the pivoting rod is connected to the frame by a chain for restricting the pivotal range of the pivoting rod.

3. The cleaning machine as claimed in claim 1, wherein the dirt receptacle includes a bottom portion having a plurality of wheels rotatably mounted thereto.

4. The cleaning machine as claimed in claim 1, which further comprises the dirt receptacle having a hole formed in a bottom portion thereof, and a foraminous dirt bag disposed inside the dirt receptacle.

5. The cleaning machine as claimed in claim 1, wherein the suction blower includes an engine and a fan drivably coupled to the engine, and wherein the inlet of the suction blower is eccentric with the rotation axis of the fan.

6. The cleaning machine as claimed in claim 1, wherein the main separator comprises a shielding cover for preventing the upward flow of dirt which has been collected in the dirt receptacle.

7. The cleaning machine as claimed in claim 6, wherein the shielding cover has a substantially conical shape, and the shielding cover is disposed within a cylindrical portion of the main separator so as to form a space therebetween.

* * * * *

UNITED STATES PATENT AND TRADEMARK OFFICE
CERTIFICATE OF CORRECTION

| | |
|---|---|
| PATENT NO. : | 5,129,125 |
| DATED : | July 14, 1992 |
| INVENTOR(S) : | Gamou et al. |

Page 1 of 4

It is certified that error appears in the above-indentified patent and that said Letters Patent is hereby corrected as shown below:

| | |
|---|---|
| Column 1 | Line 44, change "diescharged" to --discharged--; |
| Column 1 | Line 50, change "teh amin" to --the main--; |
| Column 1 | Line 59, change "Moreoer" to --Moreover--; |
| Column 1 | Line 62, change "discarede" to --discarded--; |
| Column 2 | Line 6, change "imiproved" to --improved--; |
| Column 2 | Line 9, change "wheel" to --wheels--; |
| Column 2 | Line 14, change "receptracle" to --receptacle--; |
| Column 2 | Line 27, change "EXPLANATIONOF" to --EXPLANATION OF--; |
| Column 2 | Line 28, change "whosw" to --shows--; |
| Column 2 | Line 33, change "filter." to --filter;--; |
| Column 2 | Line 41, change "vview" to --view--; |
| Column 2 | Line 45, change "detachable" to --detachably--; |
| Column 2 | Line 46, change "shkows" to --shows--; |

UNITED STATES PATENT AND TRADEMARK OFFICE
CERTIFICATE OF CORRECTION

PATENT NO. : 5,129,125
DATED : July 14, 1992
INVENTOR(S) : Gamou et al.

It is certified that error appears in the above-indentified patent and that said Letters Patent is hereby corrected as shown below:

| | |
|---|---|
| Column 3 | Line 38, after "front" insert --part--; |
| Column 3 | Line 43, change "as" to --and-- and delete "horizontally"; |
| Column 4 | Line 1, after "along" insert --a--; |
| Column 4 | Line 3, change "innewr" to --inner--; |
| Column 4 | Line 20, change "roatably put" to --rotatably mounted--; |
| Column 4 | Line 37, change "ilter" to --filter--; |
| Column 4 | Line 40, change "trnasversely" to --transversely--; |
| Column 4 | Line 56, change "shownb" to --shown--; |
| Column 4 | Line 59, change "guitd" to --guide--; |
| Column 5 | Line 26, after "1" insert --.--; |
| Column 5 | Line 46, change "openeing" to --opening--; |
| Column 5 | Line 48, change "openi-ng" to --opening--; |

UNITED STATES PATENT AND TRADEMARK OFFICE
CERTIFICATE OF CORRECTION

PATENT NO. : 5,129,125
DATED : July 14, 1992
INVENTOR(S) : Gamou et al.

It is certified that error appears in the above-indentified patent and that said Letters Patent is hereby corrected as shown below:

| | |
|---|---|
| Column 5 | Lines 59-60, change "lets the air from the suction blower 3 blow out from" to --discharges air from the suction blower 3 through--; |
| Column 5 | Line 67, change "tus" to --thus--; |
| Column 11 | Line 58, after "plate" insert --468--; |
| Column 12 | Lines 18-19, delete "the centrifugal separators 470, small dirt such as dust separated by the centrifugal separator 470,"; |

UNITED STATES PATENT AND TRADEMARK OFFICE
CERTIFICATE OF CORRECTION

PATENT NO.    :    5,129,125
DATED         :    July 14, 1992
INVENTOR(S)   :    Gamou et al.

It is certified that error appears in the above-indentified patent and that said Letters Patent is hereby corrected as shown below:

Column 12        Lines 26-27, change "separator" to --separators--;

Column 12        Line 57, change "mores" to --moves--.

Signed and Sealed this

Twenty-ninth Day of March, 1994

Attest:

BRUCE LEHMAN

*Attesting Officer*    *Commissioner of Patents and Trademarks*